March 21, 1961     J. E. FEUCHT     2,975,847
AUTOMATICALLY OPERABLE ROCK DRILL DUST COLLECTOR
Filed Oct. 8, 1958     2 Sheets-Sheet 1
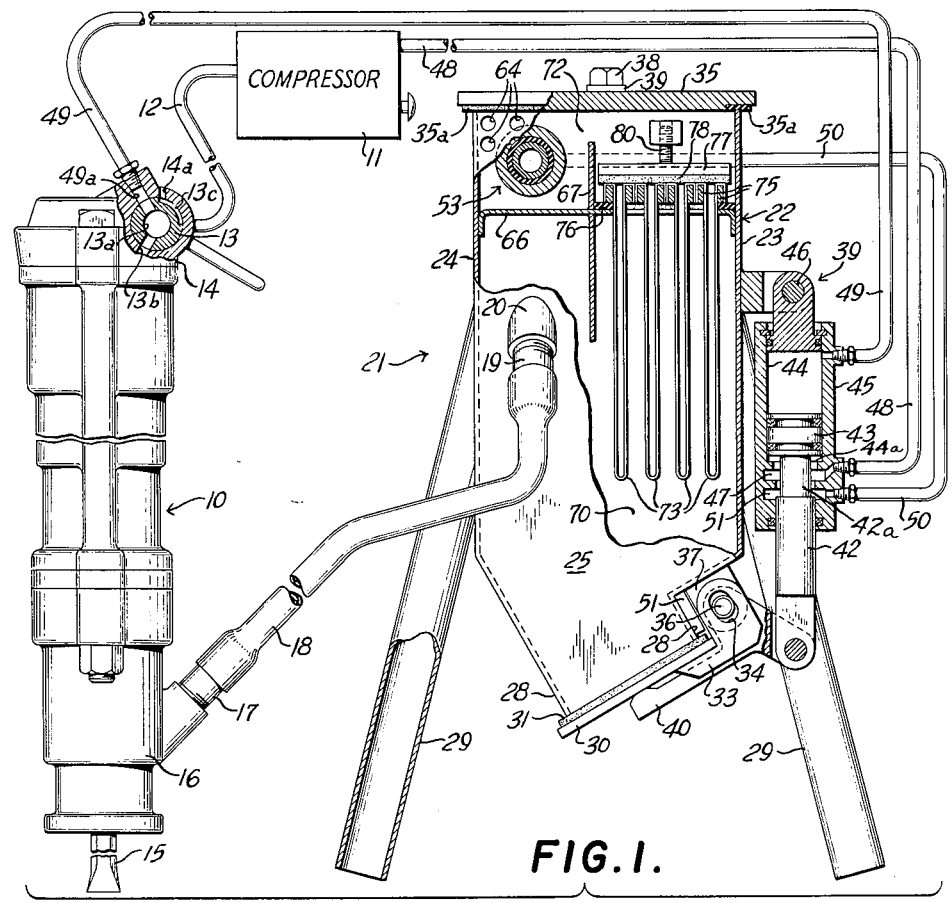
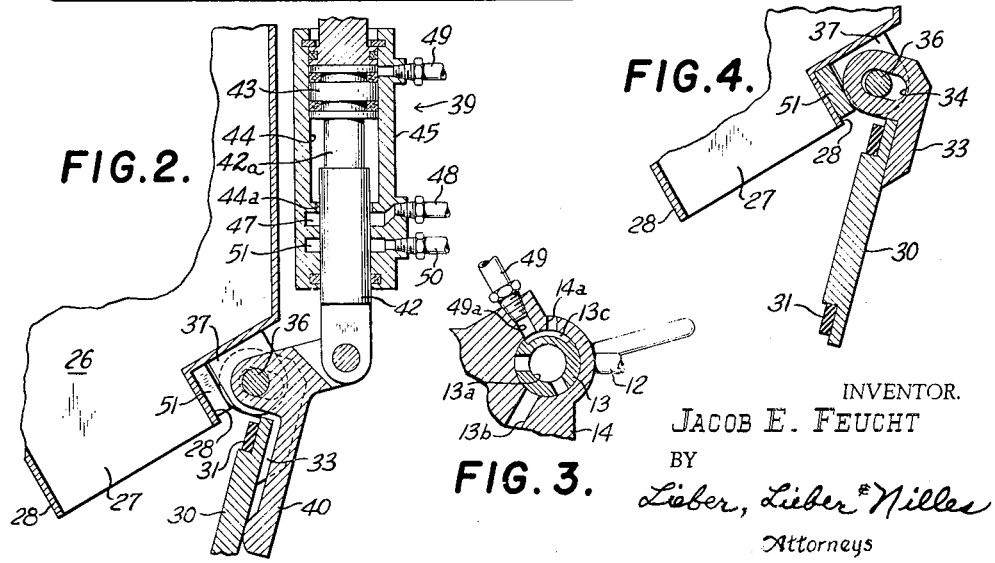
INVENTOR.
JACOB E. FEUCHT

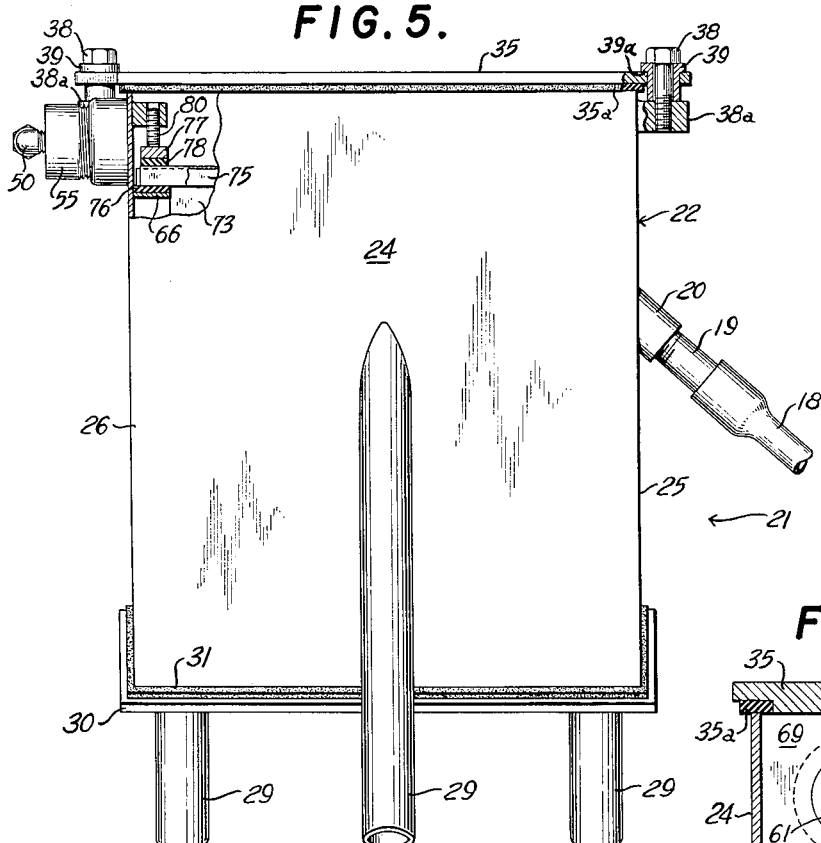
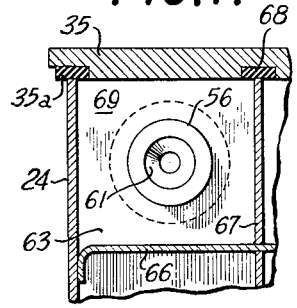
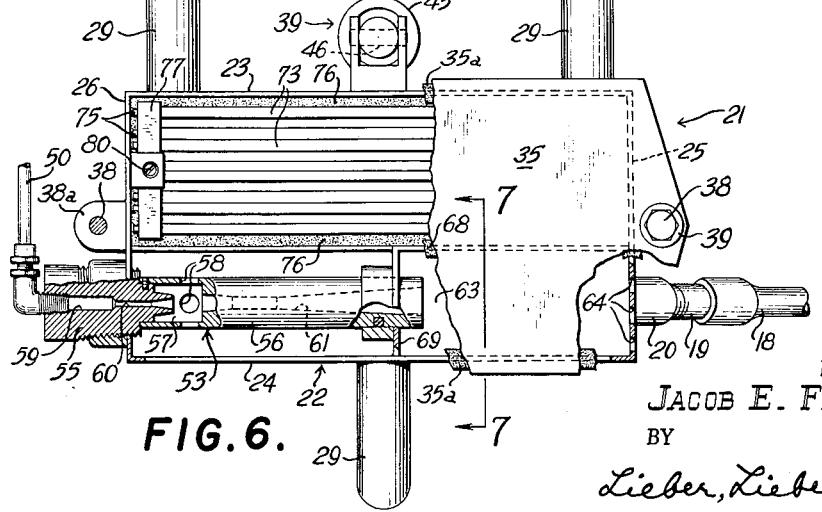

United States Patent Office 2,975,847
Patented Mar. 21, 1961

2,975,847

AUTOMATICALLY OPERABLE ROCK DRILL DUST COLLECTOR

Jacob E. Feucht, Garfield Heights, Ohio, assignor to Westinghouse Air Brake Company, Wilmerding, Pa., a corporation of Pennsylvania Filed Oct. 8, 1958, Ser. No. 765,999

6 Claims. (Cl. 175—170)

This invention relates to dust collectors for rock drills and the like.

It is generally an object of the present invention to provide an improved dust collector for a rock drill and which is automatically operable thereby.

More specifically, it is an object of the present invention to provide a dust collecting apparatus for a rock drill and operable thereby, which apparatus has an air-operated venturi for creating the necessary suction to collect the drill cuttings and dust, the apparatus also having drill-operated means for automatically dumping the collected material.

Another and important object of the invention is to provide a dust collector tank having a compact and efficient control means for automatically actuating both dump door and its suction-creating venturi means. More particularly, the control means is operable from an attached drill and is correlated with the operation thereof.

Still another and related object of this invention is to provide an improved suction-type dust collector tank and cover construction which is very simple and efficient. The arrangement provides means for pre-loading the cover sealing gasket a predetermined amount to thereby make the initial seal. Upon creation of a suction within the tank, the "floating" cover is drawn even more tightly into sealing engagement with the tank and as a result, only a minimum number of fastening means are required between the tank proper and its cover.

The invention also provides a quickly operated filter bag fastening means which insures a good seal between the venturi compartment and the dust compartment of a dust collector tank, and consequently, the complete filtering of all the discharged air.

The automatic and drill-operated collector provided by the invention is particularly portable due to its compact size and light weight and is efficient in performing its intended functions.

These and other objects and advantages of the present invention will appear later as this disclosure progresses, reference being had to the accompanying drawings, in which, by way of a preferred example, the invention has been illustrated.

In the drawings:

Figure 1 is a view of a dust tank and drill made in accordance with the present invention, certain parts being shown in section or broken away;

Figure 2 is a fragmentary, cross-sectional view of the control means shown in Figure 1, but on an enlarged scale and in the position to open the dump door;

Figure 3 is an enlarged fragmentary view of the drill valve shown in Figure 1, but in the inoperative drill position;

Figure 4 is a fragmentary view, on an enlarged scale of the door hinge joint of Figures 1 and 2;

Figure 5 is an elevational view of the tank, with parts broken away and in section;

Figure 6 is a plan view of the tank shown in Figure 5, certain parts being broken away and in section; and Figure 7 is a detail view in section, on an enlarged scale, taken on line 7—7 of Figure 6.

Referring in greater detail to the drawings, the drill 10 is of the pneumatic type which is operable by air pressure furnished from a conventional compressed air source, such as the compressor 11, via conduit 12 to a throttle valve 13 located in the backhead 14 of the drill. The valve 13 is operable by the drill operator without the necessity of him releasing his grip on the drill handle. The drill has a hollow drill steel 15 and the cuttings produced at the drill bit are sucked through the apertures in the bit and then through the hollow steel 15, the chuck housing 16, dust hose connection 17, hose 18, the tank hose connection nipple 19 and into the tank inlet connection 20 of the dust tank 21.

The dust tank contains means, to be described, for creating a suction therein and which cause the drill bit cuttings to be sucked into the tank as above-mentioned where the collected material must be periodically emptied.

The dust tank includes a body 22 that is fabricated from sheet metal and has a front wall 23, rear wall 24 and sides 25 and 26. The bottom of the tank body terminates in a rectangular opening 27 defined by the flanges 28, which opening is held a distance from the ground by the legs 29 that support the tank.

The lower discharge opening 27 of the tank is closeable by the dump door 30 which also has a compressible gasket 31 for sealing engagement with the lower ends of the flanges 28. The door has a pair of brackets 33 welded thereto and which each contain a slotted opening 34. A pivot rod 36 is fixed to the tank body by arms 37 and provides a pivot axis for the door which is mounted by its slotted brackets 33 on the rod 36 extending therethrough.

Also pivotally mounted on the rod 36 is a bell-crank 40 which at one end is adapted to bear against the lower side of door 33 and its other end is connected to a control means 39 in the form of a double-acting pneumatically-operated ram.

This control means includes a piston rod 42 to the lower end of which the crank 40 is pivotally attached. The rod 42 has a piston 43 at its upper end for reciprocation in the bore 44 of the cylinder 45, and the piston and its rod constitute a piston assembly.

As will appear more fully hereinafter, when the piston rod is moved downwardly, it acts through the bell-crank 40 to hold the door in the sealing position as shown in Figure 1. When the piston is retracted within the cylinder, the door is swung to the open position shown in Figure 2 whereby the collected material can fall to the ground. With the hinge construction as shown, the door is capable of "floating" bodily in respect to its sealing flanges around the lower parts of the tank body. Stated otherwise, the crank 40 acts to give the door the initial closing contact with the body but the vacuum subsequently produced in the tank acts on the large area of the door to pull it uniformly against the sealing lip formed by the lower end of the tank body.

As well as permitting this floating action, this hinge construction provides a definite pivot center for the opening of the door, as follows. When the door is in the closed position as viewed in Figure 1, it will be noted that the slots 34 contain the pivot rod 36 intermediate the length of the slots. If the vacuum is increased, the door can be pulled bodily, rather than pivoted, into uniform engagement with the sealing lips of the flanges 28 and without interference with the pivot rod. When the vacuum is reduced, the resilient gasket 31 will move the door outwardly so that the rod 36 is then in the upper end of the slots 34. In this position, the rod 36 is concentric with the radius of the upper end of the door brackets 33 and the door will swing open to the Figure 2 or 4 position without any binding. Furthermore, the curved radial surface of the brackets 33 bears against the block 51 to prevent the hinge brackets 33 from deviating from this center line, or center of shaft 36, until the door is completely closed at which time it can float as described above.

The walls of the tank body terminate at their upper ends to define a rectangular opening which is sealable by the cover 35 having a compressible gasket 35a that bears against the upper edges of the body for sealing engagement therewith. This cover is held in place by only two bolts 38 which are threadably engaged in their respective anchor block 38a secured to opposite sides of the tank body. A bushing 39 extends rather loosely through the cover and is tightened solidly against its anchor block so that the shoulder 39a bears against the upper side of the cover to preload the gasket slightly in making the initial seal. When the vacuum is later created in the tank, the cover and its gasket are pulled down on the bushings and firmly against the upper sealing lips formed by the upper edges of the tank walls. With this construction, only two bolts are required to securely hold the cover in place, and the cover may be easily removed to completely expose the interior of the tank for maintenance and replacement of the filtering means to be described.

The cylinder 45 is pivotally attached at 46 to the tank body and its annular groove 47 is adapted to be placed in communication with the source of pressure fluid 11. The head end of the cylinder bore 44 is communicable via conduit 49 with the throttle valve 13. Conduit 50 places the annular groove 51 of the cylinder in communication with the venturi tube assembly 53, to be described.

The venturi assembly 53 is of the air-operated type and constitutes a means for creating a suction within the tank when air pressure is delivered to it through conduit 50. This assembly includes a threaded plug portion 55 which is threadably engaged in the tank body, a venturi tube containing portion 56, and an intake chamber 57 into which the cleaned air is sucked through apertures 58. When the piston 43 is shifted downwardly as will more fully appear, the conduit 50 conducts air pressure from the control means 39, through the bore 59 and jet passage 60 of the venturi assembly, and as this air is passed through the venturi tube 61, it sucks air through apertures 58 and creates a suction in the tank 22, conduit hose 18 and the hollow drill steel 15. The vacuum created in the tank consequently causes the cuttings to be pulled into the tank via conduit 18.

The air is discharged from the venturi assembly into the muffler chamber 63 where it then passes through the holes 64 in the tank wall 25 to the atmosphere. The muffler compartment 63 is partly defined by a horizontal support which takes the form of a plate 66 secured across the interior of the tank and adjacent the upper portion thereof. That portion of the partition 67 which is located adjacent to and forms part of the compartment 63 is sealed by its gasket 68 to the cover and at its lower end abuts against plate 66. The portion of partition 67 which is located adjacent the venturi compartment does not extend up to the cover, as shown in Fig. 1. Another partition 69 forms one end of compartment 63 and also forms a support for the end of the venturi assembly which extends through partition 69. The muffler chamber 63 and its holes 64 through which the air is discharged to the atmosphere act to partially silence the venturi noise and if desired or necessary, this chamber may also be filled with sound absorbing material, such as steel wool or fibreglass to even more effectively reduce exhaust noise.

Means are provided for filtering the air as it passes from the lower dust compartment 70 into the upper venturi compartment 72. A series of filter bags 73 hang downwardly into the dust chamber and provide a considerable filtering area through which the air can pass. These bags are supported in top frames 75 which extend across the length of the tank interior. As shown in Figures 1 and 5, these frames rest on gasket material 76 supported on the plate 66. The upper edges of the filter bags are wrapped around their respective frames 75 (Figures 1 and 5) and the latter are then held in tightly assembled relationship by clamps 77 thereby clamping the bags securely in place. The bag clamps 77 take the form of a bar and also have a gasket material 78 cemented along their lower sides to assure a good seal between the venturi compartment 72 and the dust compartment 70. An adjustable threaded set screw 80 is provided for each of the clamps 77 to cause them to securely hold the clamps against the frame members 75, and permit the clamps and filter bags to be readily removed.

The use of the various highly resilient sealing gaskets above described assures a high vacuum pressure in the tank.

The general operation of the apparatus is as follows. When the throttle valve 13 is turned to the position shown in Figure 1, compressed air is supplied to the drill to operate the latter, the piston rod 42 of the control means 45 is extended to close door 30 and simultaneously acts as a valve to permit compressed air to flow to the venturi assembly 53 via conduit 50 to produce a vacuum in the system and convey the cuttings-laden air from the drill, filter the air and discharge it. More specifically, compressed air enters the center port 13a and is ported through port 13b to operate the pneumatic drill in the known manner. Compressed air is also ported through port 49a to hose 49 and to the upper side of the piston to move it downwardly, thus closing door 30. The lower side of the piston is of smaller area than its upper side and is constantly in communication with the source of air pressure 11, via conduit 48, annular groove 47 and the annular space 44a. When the piston has moved downwardly to the Figure 1 position, annular groove 47 is in communication with annular groove 51 through the undercut or reduced diameter 42a of the piston rod 42, and as a result, air is ported through conduit 50 to the venturi to create the necessary vacuum.

When the operator rotates the valve 13 to the position shown in Figure 3, the air is turned off to both the drill and the upper end of the cylinder 45 and the latter is vented to atmosphere via conduit 49, valve recess 13c and port 14a. Because the lower side of the piston is constantly in communication with the source of air, as previously described, the piston is then retracted (Fig. 2). This movement causes the piston rod to block annular groove 51, thereby shutting off the supply to the venturi and placing the tank under atmospheric pressure. The door then opens by gravity to empty the collected material which consists of coarse cuttings as well as the dust filtered from the air as the latter passes through the filter bags on its way to the venturi.

The control means provided by the cylinder 45 and its assocciated parts acts to actuate the dump door as well as control the flow of air to the venturi suction means 53. The valving provided by the cylinder and piston rod meters the air through the space 44a and controls the speed at which the door is moved. The entire arrangement is not only very efficient, but is also compact.

Various modes of carrying out the invention are conplated as being within the scope of the following claims particularly pointing out and distinctly claiming the subject matter which is regarded as the invention.

I claim:

1. In combination, a pneumatic drill having a manual valve for movement between drill operative and inoperative positions, a dust collector tank, dust conveying conduit means for conveying dust-laden air from the area adjacent said drill to said tank, suction means for creating sub-atmospheric pressure in said tank to suck said dust-laden air from said drill into said tank, a dump door mounted adjacent a lower end of said tank and shiftable between tank open and sealed positions, air operated control means carried by said tank for shifting said door, and conduit means connected between and placing said manual valve in air delivering communication with said control means, said valve having porting which when said valve is in said inoperative position the control means via the conduit means is vented, said valve having other porting which directs compressed air to said conduit means when said valve is moved to said operative position, whereby movement of said manual valve to said drill operative position actuates said control means to consequently actuate said suction pressure means and also close said door, and movement of said valve to said drill inoperative position permits said control means to stop said suction means and open said door.

2. Drilling apparatus comprising in combination, a pneumatic drill having a manual valve, a dust collector tank, dust conveying conduit means for conveying dust-laden air from the area adjacent said drill to said tank, an air-operated venturi in said tank for creating suction pressure in said tank to thereby draw the air from said drill, a dump door on said tank and shiftable between tank open and sealed positions, a double-acting pneumatic ram carried by said tank for shifting said door, said ram including a cylinder and piston, conduit means connected between and placing said manual valve in communication with one end of said cylinder, said valve having porting which when said valve is in one position the cylinder via the conduit means is vented, said valve having other porting which directs compressed air to said cylinder when said valve is moved to another position, said cylinder being communicable with said venturi, and other conduit means for placing the other end of said cylinder in constant communication with a source of pressure fluid whereby movement of said manual valve to said another position actuates said ram to consequently admit air pressure to said venturi and also to said one end of the cylinder to close said door, and movement of said valve to said one position causes said piston to shift and stop said venturi and open said door.

3. A dust collector tank for a valve operated pneumatic drill including, an air-operated suction means for creating a suction pressure in said tank, a dump door mounted on said tank for shifting between open and closed positions, and control means adapted to be pneumatically operated by said drill and mounted on said tank and connected with said door for operating the latter, said control means being in air pressure delivering communication with said suction means for operation thereof, said control means including a shiftable means movable in one direction to close said door and cause air pressure to actuate said suction means, and movable in the other direction to open said door and cut off air pressure to said suction means.

4. A dust collector tank for a valve operated pneumatic drill including, an air-operated venturi means in said tank for creating subatmospheric pressure therein, a dump door mounted on said tank for shifting between open and closed positions, and a ram adapted to be pneumatically operated by said drill and mounted on said tank and connected with said door and also in air pressure delivering communication with said venturi means, said ram including a cylinder and piston assembly, said assembly being movable in one direction to close said door and cause air pressure to actuate said venturi means, and movable in the other direction to cut off air pressure to said venturi means and open said door.

5. A device as defined in claim 1 including other conduit means for placing said control means in constant communication with a source of air pressure whereby, when said valve is moved to said inoperative position, said control means positively shuts off said suction means.

6. In combination, a pneumatic drill having a manual valve, a dust collector tank, dust conveying conduit means for conveying dust-laden air from the area adjacent said drill to said tank, suction means for creating sub-atmospheric pressure in said tank to such said dust-laden air from said drill into said tank, a dump door mounted adjacent a lower end of said tank and shiftable between tank open and sealed positions, air operated control means carried by said tank for shifting said door, and conduit means connected between and placing said manual valve in air delivering communication with said control means, said valve having porting which when said valve is in one position the control means via the conduit means is vented, said valve having other porting which directs compressed air to said conduit means when said valve is moved to another position, whereby movement of said manual valve to said another position actuates said control means to consequently actuate said suction pressure means and also close said door, and movement of said valve to said one position permits said control means to stop said suction means and open said door.

References Cited in the file of this patent
UNITED STATES PATENTS

| | | |
|---|---|---|
| 2,182,165 | Smith | Dec. 5, 1939 |
| 2,760,595 | Pynor | Aug. 28, 1956 |
| 2,771,272 | Miller | Nov. 20, 1956 |